United States Patent [19]

Melvin

[11] Patent Number: 4,808,427

[45] Date of Patent: Feb. 28, 1989

[54] TUBER TREATMENT

[75] Inventor: James S. Melvin, Aberdeen, Scotland

[73] Assignee: Aberdeen Biotech Limited, Glasgow, Scotland

[21] Appl. No.: 24,315

[22] Filed: Mar. 10, 1987

[30] Foreign Application Priority Data

Mar. 11, 1986 [GB] United Kingdom ............... 8605943

[51] Int. Cl.⁴ ............................................. A01J 21/00
[52] U.S. Cl. .................................. 426/521; 134/25.1;
134/25.3; 210/600; 15/3.1; 15/3.12; 15/3.13;
15/3.19; 99/467; 99/483
[58] Field of Search ................... 134/25.1, 25.3;
210/600; 15/3.1, 3.12, 3.11, 3.13, 3.19, 3.21;
99/467, 483; 426/509, 506, 520, 521, 522

[56] References Cited

U.S. PATENT DOCUMENTS

| | | | |
|---|---|---|---|
| 2,587,730 | 3/1952 | Hutchenson et al. | 15/3.12 |
| 2,666,711 | 1/1954 | Crosset | 15/3.12 |
| 3,207,481 | 9/1965 | Ranson | 134/25.3 |
| 3,207,487 | 9/1965 | Ranson | 134/25.3 |
| 4,173,051 | 11/1979 | Reid | 15/3.12 |
| 4,502,893 | 3/1985 | Dietrich | 134/25.3 |

Primary Examiner—H. M. S. Sneed
Assistant Examiner—Sharon T. Cohen
Attorney, Agent, or Firm—Stephen G. Rudisill

[57] ABSTRACT

The present invention relates to the treatment of potato tubers so as to reduce bacterial and other diseases therein and improve the keeping properties thereof.

The invention relates to a method comprising the steps of size-grading G potato tubers (55) and then bringing substantially soil-free size-graded tubers (55) to a thermal treatment zone T in which they are immersed in a fluid (10) at a temperature of from 45° to 85° C., for a period of time sufficient to kill at least some microorganisms without significantly damaging the tubers. According to the invention the tubers (55) are then passed substantially directly, through a drying zone D, in which they are surrounded by a hot air flow (68) having a temperature of from 40 to 75 degrees C., to dry their outer surfaces following which they are brought to a cooling zone P.

The invention also relates to an apparatus comprising a vessel (2) with an endless conveyor (4) for conveying tubers along a conveying path through hot fluid (10) held in vessel (2) at a temperature of from 45° to 85° C. According to this invention a second conveyor (57) is provided for conveying the tubers (55) through a drying zone (D) provided with an air flow induction device (67) and a heater (H) formed and arranged for inducing a hot air flow (68) having a temperature of from 40° to 65° C. around tubers (55) passing through the drying zone (D).

13 Claims, 4 Drawing Sheets

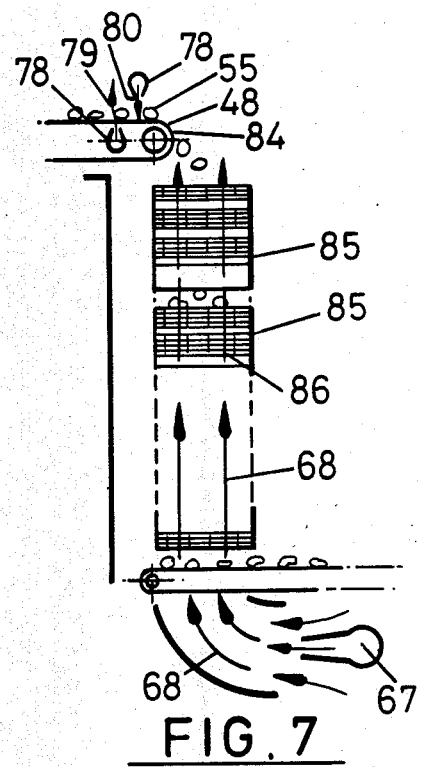
FIG. 7
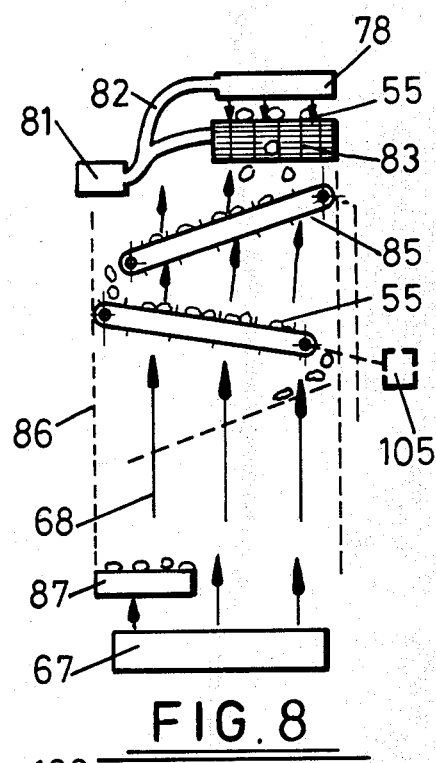
FIG. 8
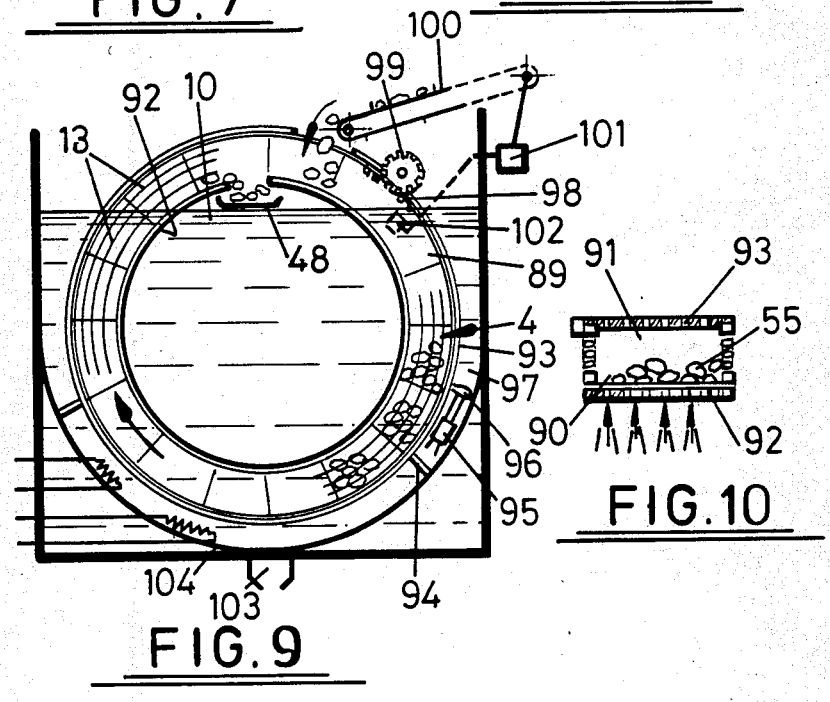
FIG. 9
FIG. 10

TUBER TREATMENT

The present invention relates to the treatment of potato tubers so as to reduce bacterial and other diseases therein and improve the keeping properties thereof.

The washing of ware potato tubers is more or less widely practised and is reasonably effective in removing soil from the surfaces of the tubers. It is, however, relatively difficult to dry the washed tubers and in general only such water as can drain away is removed with the result that in particular the tubers are packed into boxes, bags or other containers in a still damp form. This severely restricts the period of time for which they can be kept without spoiling. Although some users endeavour to reduce this problem with the aid of, for example, sponge drivers wherein the tubers are passed over sponge-covered rollers, this reduces the moisture on the tubers by only a limited amount. Moveover the rollers are rapidly subjected to a build-up of bacteria which can subsequently result in cross-contamination of other previously uncontaminated tubers passing over the rollers.

It is an object of the present invention to avoid or minimise one or more of the above disadvantages.

The present invention provides a method of reducing bacterial and other diseases in potato tubers and improving the keeping properties thereof which method comprises the steps of grading potato tubers according to size, bringing substantially soil-free size-graded potato tubers of a similar size, at a temperature at or below ambient temperature, to a thermal treatment zone; introducing said tubers into a body of thermal treatment fluid having a thermal capacity substantially larger than that of said introduced tubers such that said introduced tubers have a substantially negligible effect on the temperature of said fluid which fluid is at a temperature of from 45° to 85° C., so as to substantially wholly surround the individual tubers with said fluid, and retaining said tubers in said fluid for a period of time sufficient to substantially kill at least some micro-organisms without significantly damaging the tuber tissue; withdrawing the heated tubers from said fluid, and passing them, substantially directly, through a drying zone, in which drying zone said tubers are substantially surrounded by an induced air flow having a temperature of at least 40° C., desirably from 40° to 75° C., preferably from 50° to 65° C., for a period of time sufficient substantially to dry the outer surfaces of said tubers, without significantly damaging the tuber tissue and then bringing them to a cooling zone.

With the method of the present invention the tubers may be obtained in a substantially clean, dry and bacteria-free condition with very good storage properties. Moreover by appropriate control of the thermal treatment duration and temperature as will be further explained hereinbelow it is possible on the one hand to maintain substantially unimpaired the viability of the tuber with respect to sprouting for seed purposes or on the other hand substantially to inhibit sprouting for wear purposes. Furthermore the treatment can be effected in a relatively simple and economic manner.

The effectiveness of the method of the invention appears to arise at least in part from the substantial residual heat still present in the tubers when they are brought substantially directly to the drying zone from the thermal treatment zone i.e. without allowing substantial cooling of the tubers, which together with the use of a heated air flow over the tubers results in a rapid drying thereof.

Where the thermal treatment fluid is water (including dilute aqueous solutions) the tubers are preferably immersed in said fluid for a period of from 30 seconds at a temperature in the region of 65° C. to 10 minutes at a temperature in the region of 50° C.

Desirably the thermal treatment is carried out under temperature and time conditions such that substantially only the outer, extra-vascular, region of the tuber is heated.

Desirably the tubers are treated shortly after lifting, e.g. within 1 month, in order to minimise any development of disease in the tubers and to maximise viability especially in relation to sprouting. In practice though it has been found that the tubers may be successfully treated in accordance with the invention up to 4 months or even 8 months after lifting.

In a further aspect the present invention provides an apparatus suitable for use in the method of the present invention in the treatment of tubers and/or other like vegetable material of generally similar form, which apparatus comprises a vessel having a water holding zone, an endless conveyor means formed and arranged for conveying said tubers or the like along a conveying path having a substantial portion within said water holding zone between a conveyor loading station and a conveyor discharge station; water circulation means formed and arranged for circulating water, in use of said apparatus, so as to circulate water through said conveyor path portion, water heating means formed and arranged for heating, in use of the apparatus, said water being circulated and temperature control means formed and arranged for maintaining, in use of the apparatus, the temperature of said water at from 45° to 85° preferably 50° to 65° C.; and conveyor drive control means formed and arranged for controlling the speed of said conveyor means so as to determine the transit time between said loading and discharge stations thereby determining the residence time in said water holding zone, said conveyor means having tuber support and retaining means of generally open-work structural form so as to permit water flow therethrough to substantially all sides of said tubers, said conveyor means being further formed and arranged so as to tumble and/or roll said tubers at least along a substantial part of said conveyor path portion, and a second conveyor means formed and arranged for conveying the tubers, substantially directly, from said discharge station through a drying zone provided with an air flow induction means formed and arranged for inducing an air flow around tubers passing through said drying zone in use of the apparatus, a heater means being formed and arranged for heating said induced air flow so as to maintain an air flow temperature of at least 40°, desirably from 40° to 75°, preferably 50° to 65° C. around said tubers in use of the apparatus.

Thus with an apparatus of the present invention it is possible thermally to treat tubers and the like against temperature sensitive diseases in a closely controlled manner such as to permit substantially complete and effective treatment on a continuous basis of large amounts of tubers without significant injury to the tissue of the tuber and provides treated tubers in a substantially cleaned and dry form.

The water circulation means may be in the form of one or more discrete units but could also be constituted by suitably disposed heating means whereby water circulation is effected by convection currents and/or by the conveyor means whereby water circulation is effected by movement of the water by the conveyor means during movement of the conveyor means.

Preferably the conveyor drive control means includes temperature sensor means formed and arranged for substantially continuously monitoring, in use, the temperature of the water during conveying of tubers therethrough, and is arranged for varying the speed of the conveyor means in a predetermined proportional relation to the temperature whereby the transmit time of the tubers is varied in an inverse relation with respect to said temperatures.

Further preferred features and advantages of the invention will appear from the following detailed description given by way of example of some preferred embodiments illustrated with reference to the accompanying drawings in which:

FIG. 7 is a sectional schematic side elevation of part of an apparatus of the invention with a modified drying system;

FIG. 8 is a front elevation of the part of the apparatus of FIG. 7;

FIG. 9 is a schematic view corresponding to FIG. 1 of a further embodiment; and

FIG. 10 is a corresponding view similar to that of FIG. 9.

Figure 1:
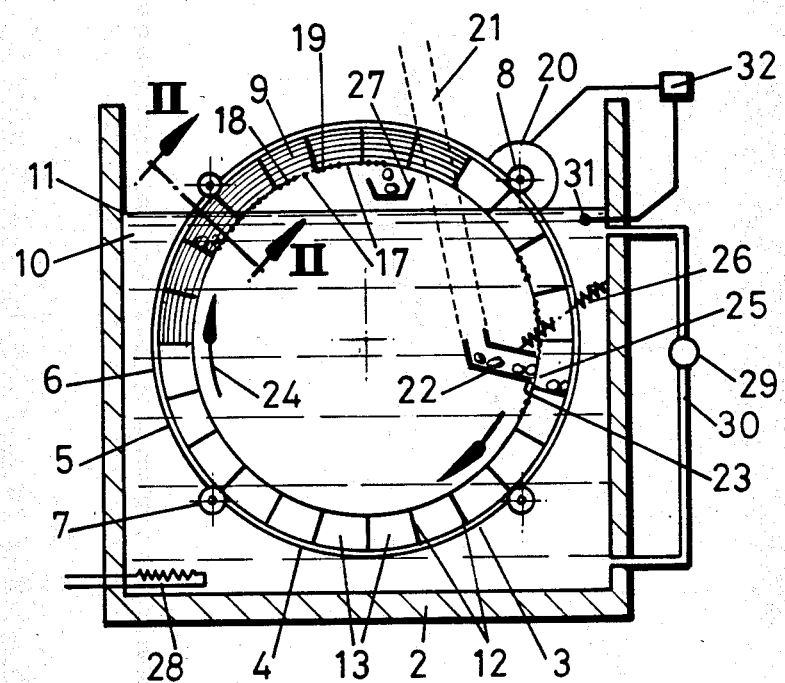
FIG. 1 is a generally schematic sectional elevation of the thermal treatment section of an apparatus of the invention.

FIG. 1 shows a thermal treatment unit 1 suitable for use in the treatment of potato blackleg. The unit 1 comprises a thermally insulated tank 2 having mounted therein a conveyor means 3. The conveyor means 3 is in the form of a large wheel 4 having along its outer circumference 5 an outwardly facing general U-shaped section guide channel 6 engaged by a plurality of circumferentially spaced apart guide wheels 7 and one or more drive wheels 8. As may be seen in FIG. 1, the wheel 4 is mounted in a vertical plane with a small outer portion 9 extending above a water holding zone 10 below the water level line 11.

In more detail the wheel 4 has a generally hemicylindrical section (see FIG. 2) and is sub-divided by divider plates 12 which extend radially, into a plurality of tuber receiving compartments 13. The radially outer sides 14 of the compartments are defined substantially by a plurality of substantially spaced apart flexible elements such as plastic covered rope 15. The radially inner sides 16 of the compartments are partly open 17 and partly enclosed at the downstream ends 18 by a plurality of spaced apart axially extending elements 19 (not that the elements 15 and 19 of only some of the individual compartments are shown).

The drive motor 20 is connected by a suitable transmission means to the drive wheel 8 for rotating the wheel 4 clockwise (as viewed in FIG. 1). As may be seen in FIG. 1, the loading chute 21 extends downwardly into the water holding zone 10 to feed tubers 22 into the wheel, at a conveyor loading station 23 positioned so that the tubers fall gently into the compartments 13 and are retained therein, as the individual compartments traverse a conveyor path 24 through the water holding zone 10. In order to protect the tubers against physical damage by trapping between the axial elements 19 and the discharge end 25 of the chute 21, the latter is urged into its loading position by resilient biasing means 26 so that if a tuber should become trapped, the chute backs away from the wheel riding over the trapped tuber 22.

At the upper part of the wheel above the water level line 11 is provided a discharge chute 27 which is mounted so as to catch tubers falling out of the compartments as these traverse the uppermost part of the conveyor path.

The tank 2 is also provided with water heating means, conveniently in the form of one or more immersion heaters 28 and water circulation means, for example a water pump 29 mounted in a water circulation conduit 30. It will be appreciated that the representation of the latter is somewhat schematic since it is important that the heating and circulation means should be arranged so as to provide as uniform and constant temperature (ca. 56° C.) in the water holding zone 10 and to maximise and make as uniform as possible the thermal transfer between the water and the tubers. Detailed arrangements may be readily determined by simple experiments.

The tank 2 is also provided with a temperature sensor 31 connected to a control means 32 for continuously monitoring the water temperature and varying the speed of the motor 20 in response thereto so as to adjust the tuber residence time in the water in accordance with any variance in temperature of the water, so as to ensure at all times an optimum thermal treatment of the tubers. Thus the motor need to be readily and precisely adjustable in speed and in this connection a hydraulic motor or possibly a pneumatic motor, is found to be particularly suitable. It will be appreciated that as the tubers are carried round along the conveyor path 24 by the wheel 4 they are subjected to a gentle tumbling action and also to a continuous flow of water thereover thereby ensuring a substantially rapid and even thermal transfer between the water and the surface layer of the tuber.

The discharge conveyor 27 extends to a cooling apparatus (not shown) formed and arranged for rapid cooling of the tubers. Conveniently the cooling apparatus comprises tuber conveyor means, conveniently in the form of a pintle belt with upstanding rubber or other more or less soft resilient deformable fingers on which the tubers are supported as they pass through a cooling zone in which cold air is blown over and around them by suitable air flow induction means such as fans to provide a rapid cooling and all-over drying of the tubers. Alternating in order to achieve a possibly even more rapid cooling of the tubers these could be conveyed into a further apparatus substantially similar to that shown in FIG. 1 in which, though, the water is maintained at a relatively low temperature e.g. 5° C., and the heating elements 28 are replaced by refrigeration elements. If required, the tubers could then be subsequently dried by blowing air over them.

Although the above apparatus has been described with reference to the treatment of potato tubers, it may also be used for the treatment of other vegetable matter such as for example bulbs, turnips and carrots. In addition, if desired for example in order to treat other diseases or parasitic contamination e.g. infestation with nematodes, one or more chemical agents may be included in the water through which the tubers are conveyed.

It will also be appreciated that various modifications may be made to the above apparatus without departing from the scope of the present invention. Thus, for example, in order to minimise any substantial temperature gradients in the surface layer of the water which could prejudice the accurate control of the thermal treatment, additional thermal insulation could be provided, for example in the form of a layer of polystyrene beads or the like floating on the surface of the water. Also in order to maximise thermal efficiency, the wheel 4 is preferably constructed of materials having a relatively low thermal capacity in order to limit heat loss at the upper section of the conveyor path. Where the apparatus is to be used for smaller sized plant matter such as for example flower bulbs, then the mesh size of the compartment walls would need to be reduced. Conveniently also the plastic covered ropes elements 15 could be replaced by a pinesh of a plastics material for greater security.

Figure 2:
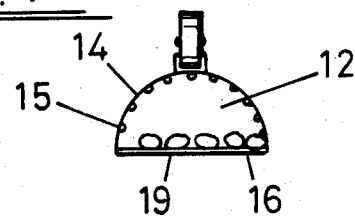
FIG. 2 is a detail transverse section of part of the conveyor means of the apparatus of FIG. 1.
Figure 3:
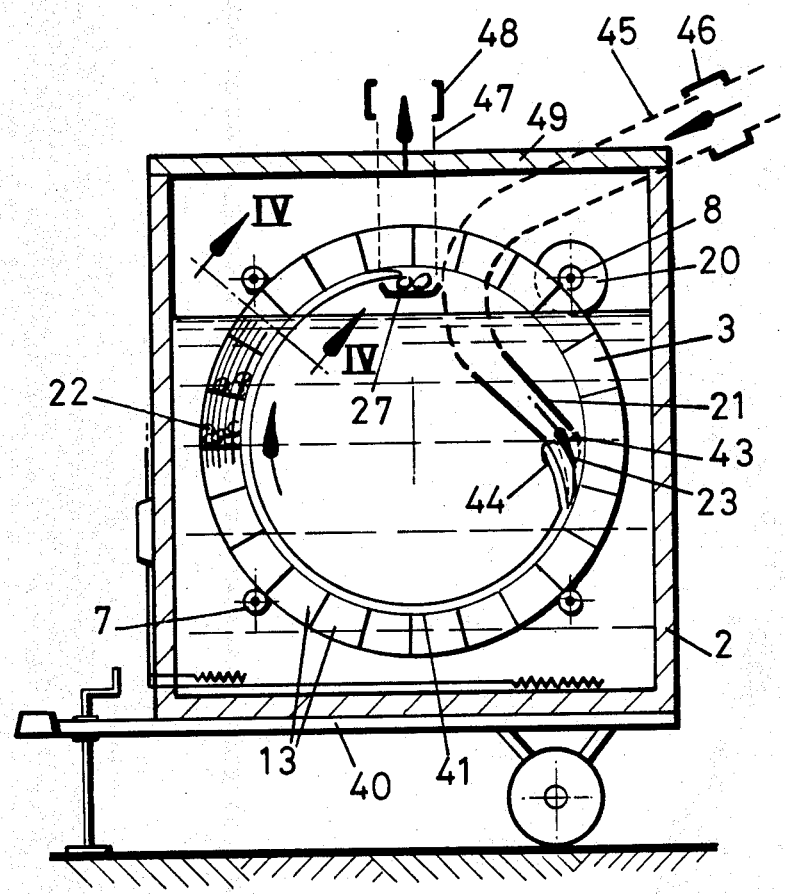
FIGS. 3 and 4 are corresponding views from a second apparatus of the invention.
Figure 4:
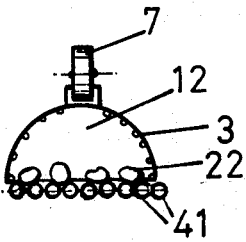

In FIGS. 3 and 4 like parts corresponding to those in FIGS. 1 and 2 have been identified by like reference indices. Also some items have been omitted to a greater or lesser extent for greater clarity.

In this case the tank 2 is mounted on a wheel chassis 40 suitable for towing by a motor vehicle so that the apparatus can be readily moved between different sites as required for use in treatment of tubers lifted at different places.

Also, the radially inner periphery of the wheel 3 is open and instead there is provided a fixed support in the form of a plurality of elongate arcuate round section elements 41 disposed in side-by-side relationship adjacent the radially inner edges 42 of the divider plates 12 of the wheel 3. Conveniently the elements 41 are in the form of tubes of a plastics material such as a polyamide or polypropylene which is relatively wear resistant and forms a low friction contact with the divider plates 12 which conveniently are made of rigid or semi-rigid rubber or plastics. This arrangement has been found to be particularly gentle on the tubers being treated.

As may be seen in FIG. 3 the fixed elements 41 are splayed out at one end 43 to form a hopper 44 for receiving tubers at the loading station 23 from the loading chute 21, and extend around the inner periphery of the wheel 3 in sliding contact with the divider plates 12 up to the discharge station 27, so as to define together with the wheel 3 a plurality of tuber receiving compartments 13.

The loading chute 21 is connected to a loading conveyor 45 (indicated schematically) which conveys the tubers 22 through a cleaning station 46 where any soil is removed to a greater or lesser extent in order to maximise thermal contact of the heated water 10 with the tuber itself during the thermal treatment. Conveniently the tubers are washed by spraying and/or immersion and desirably passed though a water bath in which they are subjected to ultrasonic radiation which assists in removal of the soil.

At the discharge station 27 there is provided a suitable belts conveyor 47 for conveying the thermally treated tubers to a cooling and optionally drying also, station 48. In practice it has been found that since tuber lifting is carried out in the Autumn, the tubers are cooled and dried sufficiently rapidly by passage along a short conveyor run of a few metres through ambient air so that they may be conveyed directed to a bagging station and cooling and drying allowed to continue naturally in the sacks especially where these are of hessian or like woven material. If desired there may be provided a mechanically assisted air flow through or across the discharge conveyor 47 downstream of the tank 2.

The tank 2 is normally provided with an insulated roof 49 to help maintain a uniform temperature and conserve energy. Suitable inlet and outlet openings, inspection hatches are provided as required and provided with suitable seals etc.

The drive system 20, 8 may be driven by any suitable means such as for example an electric or more conveniently a hydraulic motor to provide a suitable rate of rotation e.g. about ¼ r.p.m. to provide a residence time of 3 minutes in a typical arrangement using a 10 m$^3$ capacity tank holding some 8 tonnes of water. This can achieve a treatment rate of the order of 3 tonnes of tubers per hour.

As maintained hereinabove the treatment water may include suitable chemicals for simultaneous treatment of other possible conditions such as potato gangrene (Phoma exigua), black scurf (Rhizoctonia solami), powdery scab (Spongospora subterranea) etc which might also be present. Thus for example thiabendazole may be included in the treatment water.

As mentioned above the temperature and treatment time may be varied within the limits specified. Typical conditions which have been found satisfactorily maintained sprouting ability were 3 mins at 56° C. and 6 mins at 52° C.

Advantageously filter means may be provided, conveniently in the water circulation means, for avoiding buildup of soil shed from the tubers in the tank. It may also be noted that where a longer treatment time e.g. up to 30 mins would be acceptable then a treatment temperature as low as 45° C. could be used.

Figure 5:
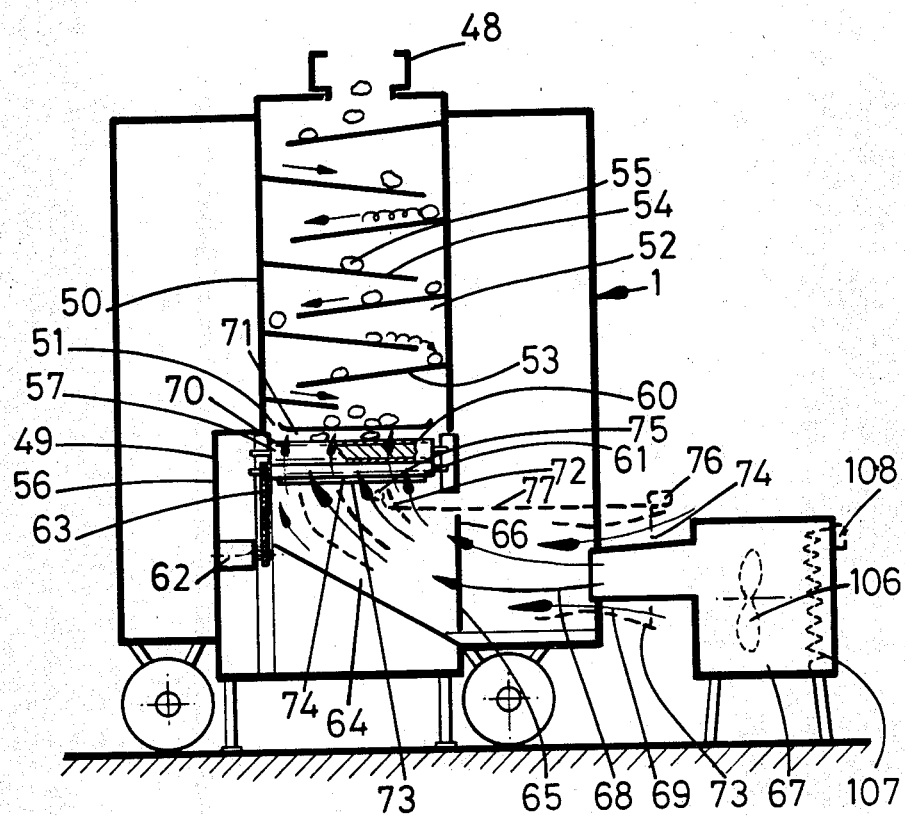
FIG. 5 is a schematic sectional elevation of the drying zone of an apparatus of the invention.

FIG. 5 shows a drying apparatus 49 set up in conjunction with the treatment apparatus 1 with a controlled descent passage means 50 disposed for receiving tubers from the treatment unit discharge conveyor 48 and bringing them down to the upstream end 51 of the drying unit 49. The passage means 50 is in the form of an enclosed chamber 52 having a plurality of successively downwardly inclined steps 53 which are preferably covered on their upper sides with a shock absorbing material such as sheet or foam rubber 54 for minimising damage to the tubers 55 passing downwardly therethrough.

Figure 6:
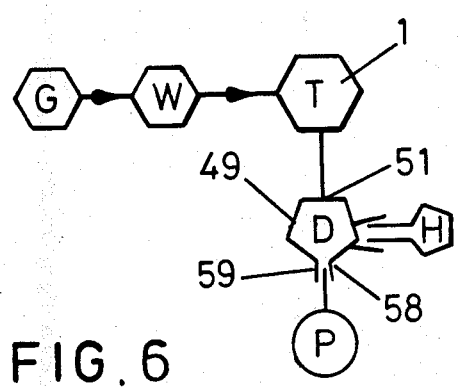
FIG. 6 is a schematic block diagram of a complete apparatus of the invention.

The drying apparatus 49 comprises a housing 56 mounting a series of more or less closely spaced conveyor rollers 57 extending generally horizontally from the upstream end of the apparatus 51 to a downstream end 58 at which may be provided a suitable chute means 59 for discharging the processed tubers 55 into suitable containers such as sacks or boxes at a packing station P (see FIG. 6). The conveyor rollers 57 are coated with a resilient absorbent material such as sponge rubber 60 for minimising damage to tubers passing thereover whilst at the same time collecting water from the surfaces thereof. The conveyor rollers 57 are driven by drive rollers 61 mounted immediately below and in driving engagement. As the drive rollers 61 and conveyor rollers 57 rotate together, the drive rollers compress the sponge rubber coating 60 thereby squeezing out water collected therein. This squeezed out water passed downwardly over the drive rollers 61 and is in turn removed therefrom by a suitable squeegee or doctor blade means 73 mounted in contact with the underside 74 of the drive rollers 61. The drive rollers 61 are in turn driven by a motor 62 which is drivably connected thereto by a suitable drive transmission means such as chain and sprocket means 63. Below the drive rollers 61 is defined an air flow passage 64 extending from an inlet 65 at one side 66 of the drying unit 49. Directly opposite the inlet 65 is disposed an air flow induction and heating means, conveniently in the form of a so-called "space-heater" 67 which directs a stream of hot air 68 into the inlet 66. This hot air flow 68 draws in and mixes the ambient air 69 so that the temperature of the air flow 70 passing up between the rollers 57, 61 is reduced to a temperature in the range of from 50°-65° C.

The heated air flow passing around the still relatively hot tubers 55 emerging from the treatment unit 1 results in a very rapid drying of residual surface water therefrom which has not drained away at the upstream end 51 of the drying unit 51 or being absorbed by the sponge covering 60 of the conveyor rollers 57.

FIG. 6 shows a schematic representation of a complete tuber processing installation comprising a size grader G formed as arranged for feeding size graded tubers G of a similar size to a washing apparatus conveniently in the form of a so-called barrel washer in which the tubers are washed substantially free of soil. This step also has the advantage of stabilising the temperature of the tubers to a suitable predetermined value e.g. 8° C. which improves the control of the thermal treatment by minimising variations in the heating of the tubers due to variations in their starting temperature with ambient temperature conditions. The clean tubers are then fed to the thermal treatment unit T from which the relatively hot clean tubers emerge to pass into the drying unit D from which in turn they are fed into suitable containers at the packing station P. At the drying station D the tubers are rapidly dried with the aid of a suitable hot air flow induction means H.

It will be appreciated that by varying the speed of the conveyor rollers 57, the transit time of the tubers in the drying unit can be varied. The transit time will also be determined by the effective length of the conveyor roller track 71. The rate of drying of the tubers will depend upon both the air flow rate and the temperature of the heated air flow. The latter should, however, desirably not significantly exceed 65° in order to avoid possible thermal damage to the tubers. Also the speed of the conveyor rollers 57 will be required to match the throughput rate of the drying unit to the discharge rate of the thermal treatment unit 1. In the specific embodiment illustrated above, the conveyor rollers had a width of approximately 1.2 meters and a conveyor track length of approximately 1.9 meters. The total air flow rate through the conveyor rollers was of the order of 1200 cubic meters per hour while the transit time of the tubers was approximately 2 minutes.

It has been found in practice that the tubers can be safely allowed to cool naturally under ambient conditions in open boxes in which they are packed over a period of the order of up to 1 to 2 days and indeed such slow cooling helps healing of any mechanical injuries the tubers may have suffered. If the process of the invention is carried out on seed potatoes not long before planting then cooling could be limited so that the temperature does not fall below a value in the range from 12° to 15° C. in which it is maintained up to the time of planting in order to encourage sprouting.

In order to further maximize the effectiveness of the thermal treatment unit 1, other chemical agents can be incorporated in the treatment water such as for example detergents and surfactants for reducing the surface tension of the water and facilitating penetration into any cracks on the surface of the tuber. Also general antibacterial agents such as hypochlorite may be included.

By means of the process and apparatus of the invention it is possible not only to effectively treat diseases such as blackleg and soft rot but also infections with potato cyst eel worm and cereal cyst eel worm.

Further possible modifications or additions to the above described embodiment which may be mentioned and are illustrated schematically in broken outline in the drawings, include the provision of battle plates 72 to distribute the air flow more evenly across the width of the conveyor. Also the air blower 67 may be connected directly to the main body of the drying apparatus 49 and/or also provided with ambient air intake means 73 formed and arranged for allowing mixing of a controlled amount of the ambient air 69 with the heated air 68. Desirably the intake means 73 is provided with mixing control means such as shutter means 74 mounted for varying the ambient air intake and mixing rate therefor with the heated air 68. Conveniently suitable temperature sensing means 75 and slave control means 76 linked 77 thereto are provided for monitoring the temperature of the air mixture and adjusting the mixing rate so as to maintain the temperature within predetermined limits.

In the embodiment of FIGS. 7 and 8 there is shown a modified form of drying means. The discharge conveyor 48 is provided with surface water mechanical displacement means in the form of high velocity air curtain devices 78 which direct high velocity curtains of air 79 at the tubers 55 passing along the discharge conveyor 48 from above and below so as to entrain the surface water and carry it away from the tubers. The air curtain devices are conveniently mounted so as their elongate slit outlets 80 can be directed at the passing tubers 55 at different angles of attack as required. The devices are supplied with pressurized air from an air pump means 81 via suitable conduits 82. In order to facilitate airflow 79 from the underside of the tubers, the discharge conveyor 48 is made of an open weave type of construction 83.

The downstream end 84 of the discharge conveyor 48 is disposed above a cascade series of drying zone conveyors 85 which progressively carry the tubers 55 down through the drying zone 86 to a final conveyor means 87 which carry the dried tubers to a packing station P (see FIG. 6). The drying zone conveyors 85 are again of open weave construction 86 so as to allow a hot air flow 68 to pass upwardly therethrough. The conveyors 85 are also provided with flight panel 88 for holding the tubers as they are transported downwardly by the conveyors 85.

The drive conveyors 85 arrangement and their speed of operation is adapted so as to provide a drying zone residence time sufficient to provide substantially complete drying of the tubers without substantially damaging the tube tissue, for example using a hot air supply temperature of about 60° C., a residence time of approximately two minutes may be suitable depending of course on other factors such as the water treatment temperature and time. In this connection it will course be appreciated that the water treatment temperature and time will itself be affected by the ambient temperature and more particularly the temperature of the tubers themselves when they are brought into the water treatment zone, not to mention the size of the tubers. Suitable conditions can of course be readily determined, for example, by simple trial and error.

FIGS. 9 and 10 illustrate a modified form of hot water treatment device for use in the apparatus of the invention. In this case the main circular conveyor 4 in the form of a wheel structure 89 having open radially inner and radially outer faces 90, 91 and mounted for rotation between spaced apart annular perforated plates 92, 93, which are fixed 94 to the main body of the vessel. Thus as the wheel 89 rotates the tubers 55 are tumbled over the perforated plates 92, 93.

The water circulation means in this case is in the form of a water pump 95 provided with outlet nozzles 96 formed and arranged for directing jets of the hot water 97 held in the vessel through suitable apertures in the outer plate 93 at and between the tubers 55 being carried round by the wheel 89.

The wheel 89 is provided with a peripheral extending rack 98 engageable by a drive pinion 99 in order to provide a positive driving of the wheel 89 thereby to avoid any possible variation in transit time due to slippage in the wheel drive system.

The tuber feed conveyor 100 is mounted so as to supply tubers to the wheel conveyor 89 in proximity to the wheels top dead centre and is provided with a drive control means 101 which in turn is provided with a wheel compartment sensor 102 formed and arranged for detecting the position of advancing compartments 13 so as to inactivate the feed conveyor 100 as required in order to avoid filling of individual compartments beyond a predetermined maximum limit, e.g. ¾ of the compartment volume.

As noted hereinbefore, the tubers are desirably cleaned before entry into the water treatment zone 10. Nevertheless over a period of time a degree of sludge may accumulate in the vessel and desirably therefore they are provided sludge removal apertures etc. 103 at the base 104 of the vessel. An advantage of the water displacement means of the embodiment of FIG. 7 and 8 are that these are substantially self-cleaning and thus reduce the requirements for cleaning of this part of the apparatus.

As also noted hereinabove, the water 97 in the water treatment zone 10 may conveniently contain suitable additives in order to enhance the effect of the treatment. Thus on the one hand there may be included a suitable surfactant e.g. a non-ionic detergent in order to accelerate watering of the tuber surfaces. A detergent such as hypochlorite, e.g. at an available chlorine concentration of 550 parts per million may be included. It will of course be appreciated that where there is a significant degree of water hardness in the water being used, then this should be taken into account when determing the concentration of any additive to be used.

Finally, in FIG. 5 there is shown an optional form of hot air supply means in dashed outline comprising a fan means 106 and an electrical heater element 107 provided with a suitable thermal input control means 108.

What is claimed is:

1. A method of reducing bacterial and other diseases in potato tubers and improving the keeping properties thereof which method comprises the steps of grading potato tubers according to size, bringing substantially soil-free size-graded potato tubers of a similar size, at a temperature at or below ambient temperature, to a thermal treatment zone; introducing said tubers into a body of thermal treatment fluid having a thermal capacity substantially larger than that of said introduced tubers such that said introduced tubers have a substantially negligible effect on the temperature of said fluid which fluid is at a temperature of from 45° to 85° C., so as to substantially wholly surround the individual tubers with said fluid, and retaining said tubers in said fluid for a period of time sufficient to substantially kill at least some microorganisms without significantly damaging the tuber tissue; withdrawing the heated tubers from said fluid and passing the withdrawn tubers substantially directly, through a drying zone, in which drying zone said tubers are substantially surrounded by an induced air flow having a temperature of at least 40° C., for a period of time sufficient substantially to dry the outer surfaces of said tubers, without significantly damaging the tuber tissue and then bringing to a cooling zone.

2. A method as claimed in claim 1 which includes a step of mechanically displacing at least part of the water on the tuber surface at or immediately before said drying zone in which the tubers are surrounded with the hot induced air flow.

3. A method as claimed in claim 2 in which said mechanical displacement of water is effected by means of at least one high velocity air stream through which said tubers are passed.

4. A method as claimed in claim 2 wherein said mechanical displacement is effected by means of absorbent rollers contacting said passing tubers.

5. An apparatus suitable for use in the treatment of tubers and other like vegetable material of generally similar form, which apparatus comprises a vessel having a water holding zone, an endless conveyor means formed and arranged for conveying said tubers along a conveying path having a substantial portion within said water holding zone between a conveyor loading station and a conveyor discharge station; water circulation means formed and arranged for circulating water through said conveyor path portion, water heating means formed and arranged for heating, in use of the apparatus, said water being circulated and temperature control means formed and arranged for maintaining, in use of the apparatus the temperature of said water at from 45° to 85° C.; conveyor drive control means formed and arranged for controlling the speed of said conveyor means so as to determine the transit time between said loading and discharge stations, said conveyor means having tuber support and retaining means of generally open-work structural form so as to permit water flow therethrough to substantially all sides of said tubers, said conveyor means being further formed and arranged so as to roll said tubers at least along a substantial part of said conveyor path portion, a second conveyor means formed and arranged for conveying the tubers substantially directly, from said discharge station through a drying zone provided with an air flow induction means formed and arranged for inducing an air flow around tubers passing through said drying zone in use of the apparatus, and heater means formed and arranged for heating said induced air flow so as to maintain an air flow temperature of at least 40 degrees C. around said tubers in use of the apparatus.

6. An apparatus as claimed in claim 5, wherein is provided a mechanical water displacement means formed and arranged for mechanically displacing, in use of the apparatus, at least part of the water in the tuber surface at or substantially directly upstream of said drying zone.

7. An apparatus as claimed in claim 6 wherein said water displacement means is in the form of at least one absorbent roller.

8. An apparatus as claimed in claim 6 wherein said water displacement means is in the form of a high-velocity air flow induction means having at least one outlet means formed and arranged so as to direct a high velocity air jet at tubers passing through or towards said drying zone.

9. An apparatus as claimed in claim 8, wherein said at least one outlet means is in the form of at least one narrow elongate slit.

10. An apparatus as claimed in claim 5 wherein the heated air flow induction means comprises a fuel gas burner and is formed and arranged for mixing air with the gaseous combustion products of said fuel gas, in use of the apparatus, upstream of the drying zone, so as to produce an induced air flow having a temperature within the range of from 40° to 75° C. in said drying zone.

11. An apparatus as claimed in claim 5 wherein the heated air flow induction means comprises a fan or propeller means and a heating element disposed within the induced air flow from said fan or propeller means.

12. An apparatus as claimed in claim 11 wherein is provided a thermal input control means for varying the degree of heating of said induced air flow.

13. An apparatus as claimed in claim 5 wherein is provided a second conveyor speed control means formed and arranged for varying the residence time of the tubers in said drying zone.

* * * * *